*H. C. Weihe,*
*Machine Gearing.*
N° 78,627. Patented June 2, 1868.
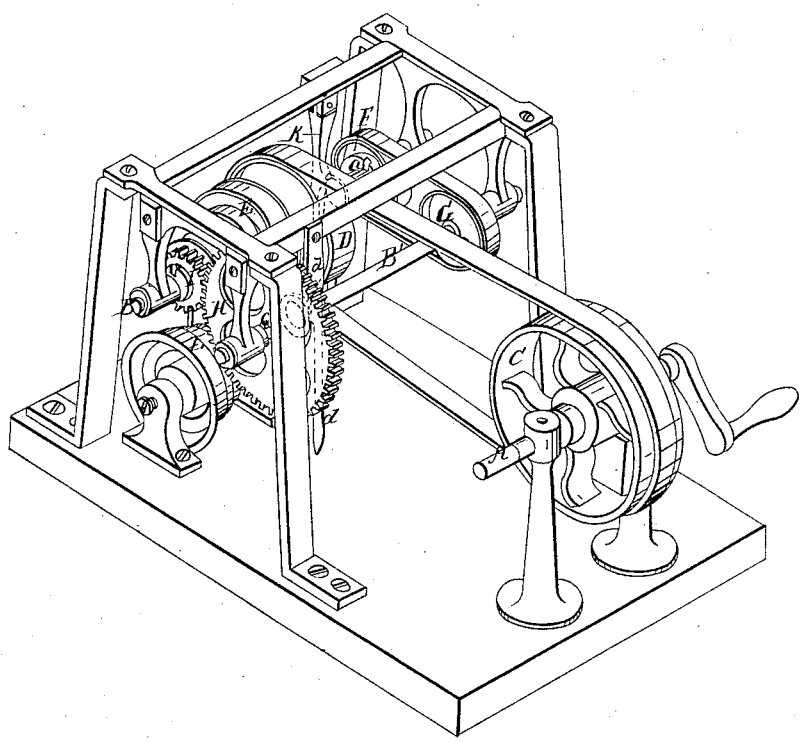
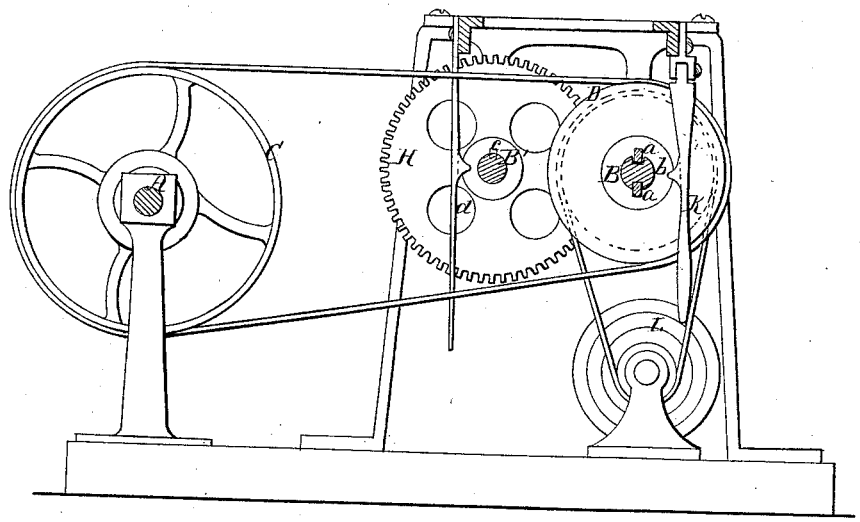
N. PETERS, PHOTO-LITHOGRAPHER, WASHINGTON, D. C.

United States Patent Office.

HERMAN C. WEIHE, OF PHILADELPHIA, PENNSYLVANIA.

Letters Patent No. 78,627, dated June 2, 1868.

IMPROVEMENT IN COUNTER-SHAFTING.

*The Schedule referred to in these Letters Patent and making part of the same.*

TO ALL WHOM IT MAY CONCERN:

Be it known that I, HERMAN C. WEIHE, of the city of Philadelphia, and State of Pennsylvania, have invented Improvements in Counter-Shafting; and I do hereby declare that the following is a full, clear, and exact description of the same, reference being had to the accompanying sheets of drawings, and to the letters of reference marked thereon.

My improvements consist of such mechanism as is hereinafter shown and described, whereby the back travel of the slide-rest of a screw-cutting lathe, or other slide-lathe, is accelerated, without any additional lathe-mechanism.

On reference to the accompanying sheets of drawings, making parts of this specification—

Sheet 1 exhibits a plan view of my invention, and

Sheet 2 an end elevation of the same.

Similar letters refer to similar parts in the two views.

A is a main line of shafting; B B' are counter-shafting. A pulley, C, on the shafting A, is belted to the pulley D on the counter-shaft B. E is a loose cone-pulley on the shaft B. F is a loose pulley on the same counter-shaft, and is belted to a pulley, G, on the counter-shaft B'. H is a shifting-wheel, which gears into the pinion I on the shaft B, fixed to the cone-pulley E. $a$ is a sliding feather on the shaft B. It takes, respectively, into the corresponding notches in the hubs of the pulleys E and F, according to the direction which it is shifted by the shifting-lever K, which takes over the collar, $b$, of the feather; $c$ is a feather on the shaft B', by which the wheel H has a rotating motion from its shaft, and a sliding motion from the shifting-lever $d$. As shown in the accompanying sheets of drawings, the motion imparted to the pulley D by the pulley C is imparted to the cone-pulley E through the medium of the wheel and pinion H and I, for the feather $a$ takes into the hub of the loose pulley F, causing it to rotate with the shaft B, which motion is by belting imparted to the shaft B', which carries the wheel H, the cone-pulley E being belted to the cone-pulley L of the lathe, which in turn is connected by suitable gearing to the feed-screw of the slide-lathe.

It will be readily seen that the speed at which the slide-rest is retreated for a repetition of the cut, depends on the relative diameters of the wheel H and the pinion I.

When the slide-lathe has reached the beginning of the cut, the shifting-lever K is thrown forward, which uncouples the feather $a$ and the pulley F, and couples it with the loose cone-pulley E. The shifting-lever $d$ is also made to disengage the wheels H and I, and on the lathe being started, the feed-screw carries the slide-rest forward, and so on until the work is completed.

What I claim as my invention, and desire to secure by Letters Patent, is—

1. The parallel counter-shafting B B', sliding spur-wheel H, fixed pinion I, and the loose cone-pulley E, when combined and arranged substantially as shown and described.

2. The parallel counter-shafting B B', fixed pulley G, loose pulley F, sliding feather $a$, collar $b$, shifting-lever K, and the loose cone-pulley E, when combined and arranged substantially as shown and described.

3. The parallel counter-shafting B B', loose pulley F, fixed pulley G, sliding feather $a$, loose cone-pulley E, feather $c$, sliding gear H, and the pinion I, when combined and arranged substantially as shown and described.

4. The main shafting A, parallel counter-shafting B B', pulley C, pulley D, loose cone-pulley E, feather $a$, loose pulley F, and the fixed pulley G, when combined and arranged as herein shown and described.

In testimony whereof, I hereunto sign my name to this specification in presence of two subscribing witnesses.

HERMAN C. WEIHE.

Witnesses:
 FRANCIS D. PASTORIOUS,
 W. W. DOUGHERTY.